US006866296B2

(12) United States Patent
Webber et al.

(10) Patent No.: US 6,866,296 B2
(45) Date of Patent: Mar. 15, 2005

(54) SEAT RESTRAINT TENSIONER

(75) Inventors: James L. Webber, Shelby Township, MI (US); David G. Hlavaty, Northville, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/080,264

(22) Filed: Feb. 21, 2002

(65) Prior Publication Data

US 2003/0090100 A1 May 15, 2003

Related U.S. Application Data

(60) Provisional application No. 60/337,296, filed on Dec. 4, 2001, and provisional application No. 60/333,291, filed on Nov. 14, 2001.

(51) Int. Cl.$^7$ ............................................. B60R 22/46
(52) U.S. Cl. ....................................... 280/806; 297/480
(58) Field of Search ........................... 280/806; 296/480

(56) References Cited

U.S. PATENT DOCUMENTS

| | | | |
|---|---|---|---|
| 5,492,368 A | | 2/1996 | Pywell et al. |
| 5,495,790 A | * | 3/1996 | Greiner ....................... 280/806 |
| 5,707,080 A | * | 1/1998 | Isaji et al. ................... 280/806 |
| 6,039,352 A | * | 3/2000 | Wier ........................... 280/806 |
| 6,068,664 A | | 5/2000 | Meyer et al. |
| 6,213,511 B1 | * | 4/2001 | Downie et al. ............. 280/806 |

* cited by examiner

Primary Examiner—Eric Culbreth
(74) Attorney, Agent, or Firm—Scott A. McBain

(57) ABSTRACT

A seat restraint tensioner for a seat restraint system in a vehicle includes a cable having a first end and a second end. The first end is operatively connected to a seat restraint of the seat restraint system. The seat restraint tensioner also includes a movable mechanism connected to the second end of the cable to apply a force for tightening the seat restraint when activated. The seat restraint tensioner further includes a rotatable cam cooperating with the cable to generate a clamping force toward the seat restraint to clamp the cable between the cam and a clamping surface to prevent reverse travel of the cable after tightening the seat restraint.

24 Claims, 5 Drawing Sheets

SEAT RESTRAINT TENSIONER

CROSS-REFERENCE TO RELATED APPLICATION(S)

The present invention claims the priority date of copending U.S. Provisional Patent Application Ser. No. 60/337,296, filed Dec. 4, 2001 and copending U.S. Provisional Patent Application Ser. No. 60/333,291, filed Nov. 14, 2001.

TECHNICAL FIELD

The present invention relates generally to seat restraint systems for vehicles and, more particularly, to a seat restraint tensioner for a seat restraint system in a vehicle.

BACKGROUND OF THE INVENTION

It is known to provide a seat restraint system such as a seat belt in a vehicle to restrain an occupant in a seat of the vehicle. In some vehicles, the seat restraint system may be a lap belt, a shoulder belt, or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

It is also known to provide a seat belt tensioner in the seat restraint system for tensioning an occupant belt restraint in the event of sudden vehicle deceleration. An example of such a seat belt tensioner is disclosed in U.S. Pat. No. 5,492,368 to Pywell. In this patent, the seat belt tensioner has a housing with a piston slidably mounted therein and a seat belt reel attached to a shaft of the piston. The seat belt tensioner is operated by pushing a piston with pyrotechnically generated gas and mechanically translating that force into seat belt reeling to wind the belt and seat belt tensioning.

It is further known to provide seat belt tensioners as buckle pretensioners with various cable locking methods. For example, it is known to use a ball and ramped piston-locking method for a buckle pretensioner. However, the ball and ramped piston results in high loads from the buckle assembly through the cable and into the piston.

It is desirable to provide a new seat restraint tensioner for a buckle assembly in a seat restraint system of a vehicle. It is also desirable to provide a seat restraint tensioner that provides seat belt pretensioning for a seat restraint system of a vehicle. It is further desirable to provide a seat restraint tensioner for a seat restraint system in a vehicle that is less costly and has a smaller package.

SUMMARY OF THE INVENTION

It is, therefore, one object of the present invention to provide a seat restraint tensioner for a seat restraint system in a vehicle.

It is another object of the present invention to provide a seat restraint tensioner for a seat restraint system in a vehicle as a buckle pretensioner.

To achieve the foregoing objects, the present invention is a seat restraint tensioner for a seat restraint system in a vehicle including a cable having a first end and a second end. The first end is operatively connected to a seat restraint of the seat restraint system. The seat restraint tensioner also includes a movable mechanism connected to the second end of the cable to apply a force for tightening the seat restraint when activated. The seat restraint tensioner further includes a rotatable cam cooperating with the cable to generate a clamping force toward the seat restraint to clamp the cable between the cam and a clamping surface to prevent reverse travel of the cable after tightening the seat restraint.

One advantage of the present invention is that a new seat restraint tensioner is provided for a seat restraint system in a vehicle. Another advantage of the present invention is that the seat restraint tensioner is used as a buckle pretensioner to pull-down the buckle assembly to restrain an occupant in the vehicle. Yet another advantage of the present invention is that the seat restraint tensioner provides seat belt pretensioning and is of a linear type. Still another advantage of the present invention is that the seat restraint tensioner has a cam that generates a clamping force on a cable and prevents reverse travel of the cable and therefore the buckle assembly. A further advantage of the present invention is that the seat restraint tensioner has cable locking that results in a high tensile load path directly from the buckle assembly through the cable and into the cam and mounting stud. Yet a further advantage of the present invention is that the seat restraint tensioner has a relatively low cost, simpler assembly and smaller packaging than current pretensioners.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
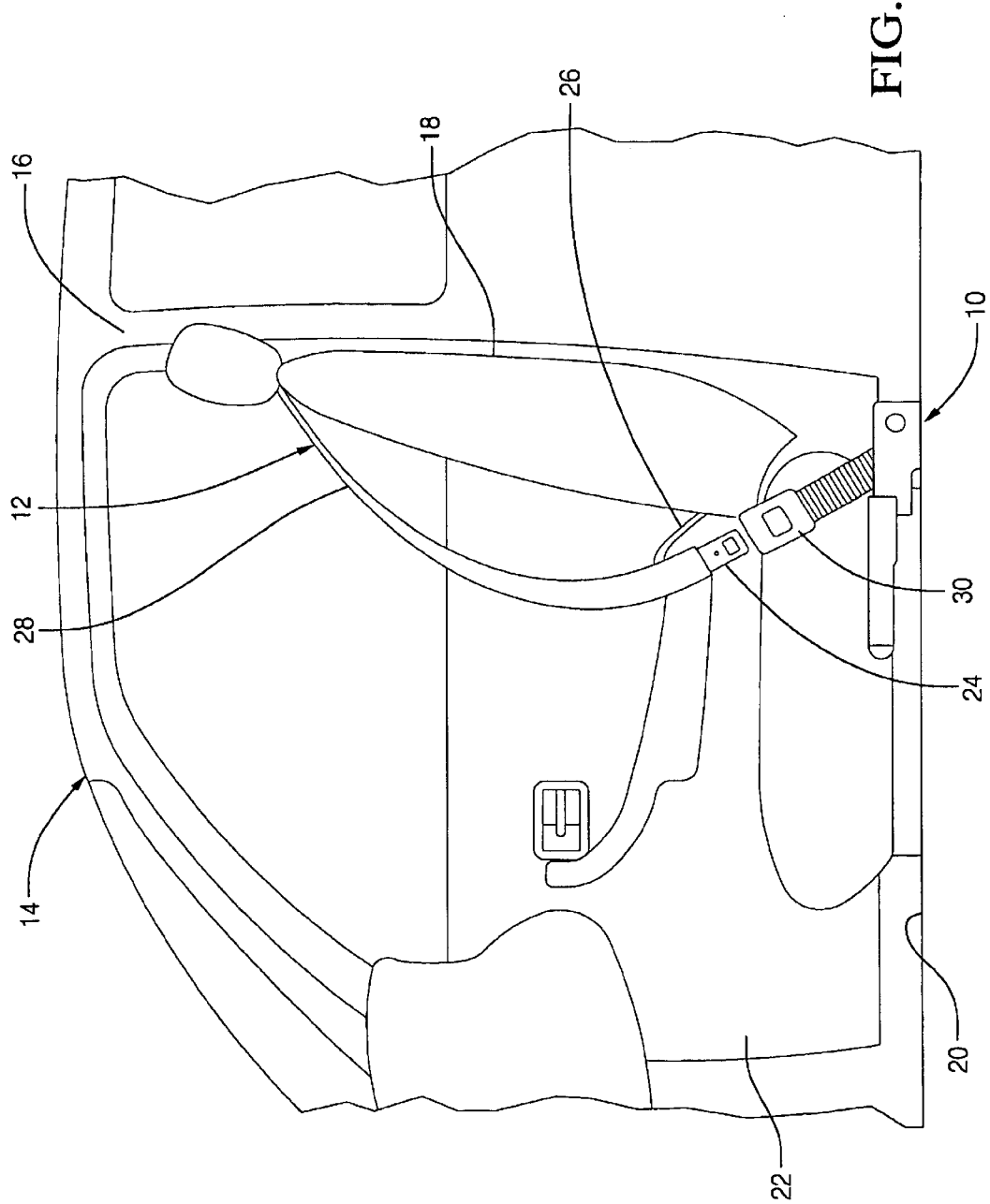
FIG. 1 is an elevational view of a seat restraint tensioner, according to the present invention, illustrated in operational relationship with a seat restraint system of a vehicle.

Referring to the drawings and in particular FIG. 1, one embodiment of a seat restraint tensioner 10, according to the present invention, is shown for a seat restraint system, generally indicated at 12, in a vehicle (partially shown), generally indicated at 14. The vehicle 14 includes a vehicle body 16 and a seat 18 mounted by suitable means to vehicle structure 20 such as a floorpan in an occupant compartment 22 of the vehicle body 16. In this embodiment, the seat 18 is a front seat of the vehicle 14. It should be appreciated that the seat 18 could be a rear, second row, or third row seat for the vehicle 14.

The vehicle 14 includes the seat restraint system 12 for restraining an occupant (not shown) in the seat 18. The seat restraint system 12 includes a latch tongue or plate 24 connected to an end of either on of a lap belt 26, shoulder belt 28, or both. In this embodiment, the shoulder belt 28 has another end connected to a seat belt retractor (not shown). The other end of the lap belt 26 is connected by suitable means such as an anchor plate (not shown) to the vehicle structure 20 or the seat 18. The seat restraint system 12 also includes a buckle assembly 30 connected to the seat restraint tensioner 10 to be described. As illustrated, the seat restraint tensioner 10 is mounted to an inboard side of the seat 18 and the buckle assembly 30 may extend above the seat cushion of the seat 18 and the seat restraint tensioner 10 extends towards a front of the vehicle 14. The latch plate 24 is engageable and disengageable with the buckle assembly 30 as is known in the art. It should be appreciated that, except for the seat restraint tensioner 10, the seat restraint system 12 and vehicle 14 are conventional and known in the art.

Figure 2:
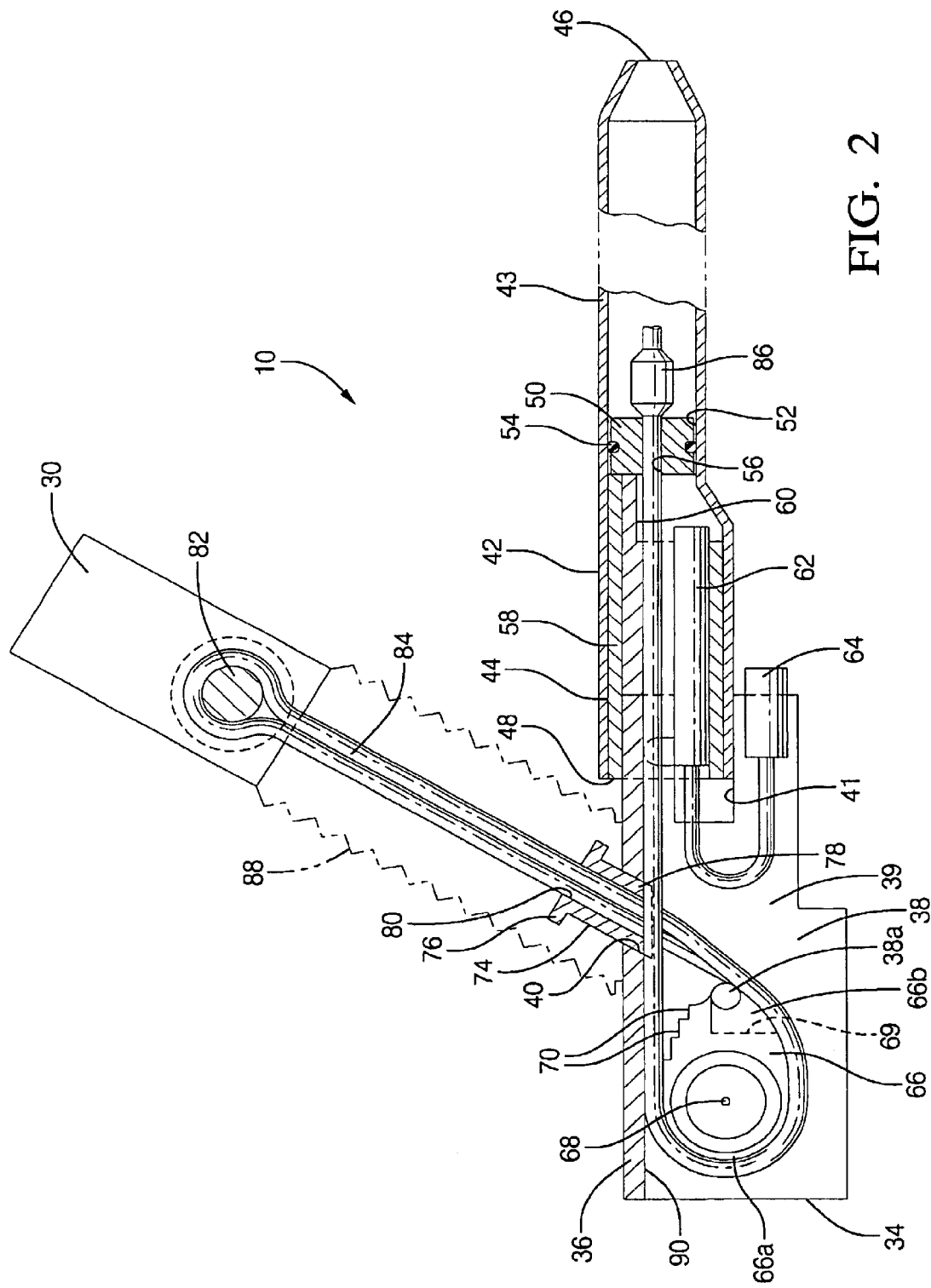
FIG. 2 is an enlarged fragmentary side elevational view of the seat restraint tensioner of FIG. 1 illustrating a first operative position.
Figure 3:
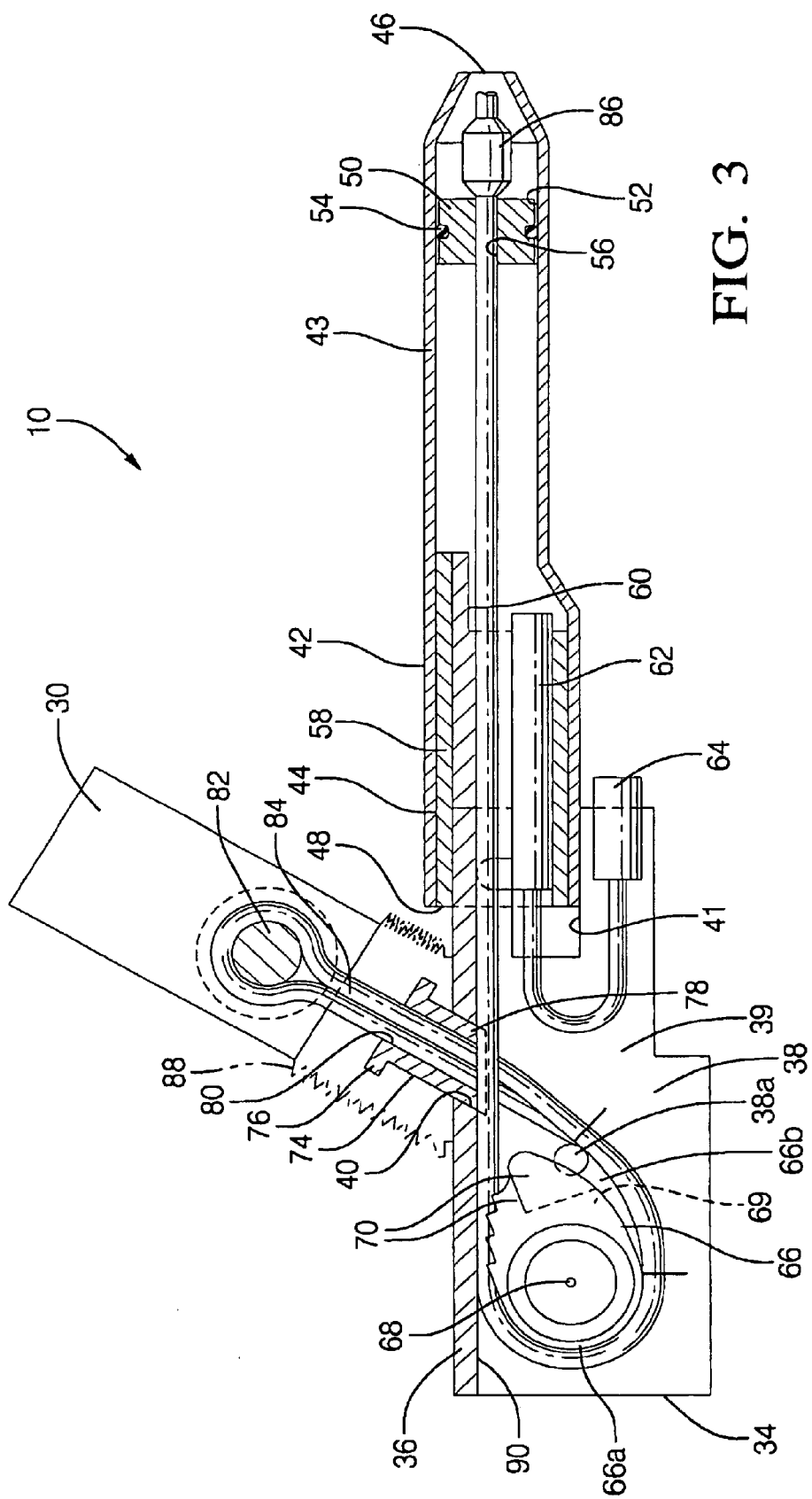
FIG. 3 is a view similar to FIG. 2 of the seat restraint tensioner illustrating a second operative position.

Referring to FIGS. 1 through 3, the seat restraint tensioner 10, according to the present invention, includes a frame 34 connected to the vehicle structure 20 or seat 18 by suitable means such as fasteners (not shown). The frame 34 has a generally inverted "U" shape and is made of a metal material such as steel. The frame 34 has a base wall 36 and opposed side walls 38 extending generally perpendicularly from the base wall 36 to form a channel 39 therebetween. Each of the side walls 38 has a stop 38a extending axially into the channel 39 for a function to be described. The base wall 36 has an aperture 40 extending therethrough for a function to be described. Each of the side walls 38 have a slot 41 extending axially therein for a function to be described. It should be appreciated that the frame 34 is a monolithic structure being integral, unitary, and one-piece.

The seat restraint tensioner 10 also includes a housing 42 secured to the frame 34 by suitable means such as press-fitting. The housing 42 has a first or piston portion 43 extending longitudinally and a second or gas generation portion 44 extending longitudinally from the piston portion 43 at a forward end thereof and having an enlarged diameter. The piston portion 43 is generally tubular in shape with a generally circular cross-sectional shape. The gas generation portion 44 is generally tubular in shape with a generally tear-drop cross-sectional shape. The piston portion 43 has an aperture 46 extending axially through an end thereof for a function to be described. The gas generation portion 44 has an aperture 48 extending axially through an end thereof for a function to be described. The housing 42 is made of a metal material such as steel or aluminum. It should be appreciated that the housing 42 is disposed over a portion of the frame 34 and extends into the slots 41 in the side walls 38.

The seat restraint tensioner 10 includes a piston 50 disposed in the piston portion 43 of the housing 42. The piston 50 is generally cylindrical in shape for sliding movement in the piston portion 43. The piston 50 has an annular groove 52 and a seal 54 such as an O-ring disposed in the annular groove 52 to form a seal with an interior surface of the piston portion 43 of the housing 42 to prevent gases from escaping past the piston 50. The piston 50 also has a passageway 56 extending axially therethrough for a function to be described. The piston 50 is made of a rigid material such as a thermoplastic material, preferably a glass-filled nylon.

The seat restraint tensioner 10 further includes a retainer 58 disposed in the end of the gas generation portion 44 of the housing 42. The retainer 58 is generally tubular in shape with a generally tear-drop cross-sectional shape. The retainer 58 extends axially into the gas generation portion 44 between the housing 42 and the frame 34. The retainer 58 has a cutout or recess 60 extending axially therein for a function to be described. The retainer 58 is secured in the piston portion 43 by suitable means such as crimping. The retainer 58 is made of a rigid material such as a thermo-plastic material. It should be appreciated that the retainer 58 retains the housing 42 to the frame 34.

The seat restraint tensioner 10 also includes a gas generator 62 such as a micro gas generator assembly disposed in the gas generation portion 44 of the housing 42. The gas generator 62 is a pyrotechnic device similar to that used for inflators in inflatable restraint systems to expel a gas into the housing 42. The gas generator 62 includes an electrical connector 64 connected to a source of power (not shown) for activating the pyrotechnic device to expel the gas. The gas generator 62 extends through the aperture 48 in the gas generation portion 44 of the housing 42 and into the recess 60 to expel gas in the gas generation portion 44. The gas generator 62 is mounted in the retainer 58 by suitable means (not shown). It should be appreciated that the gas expelled by the pyrotechnic device of the gas generator 62 will move the piston 50 longitudinally in the piston portion 43 of the housing 42 as illustrated by the arrow in FIG. 3. It should also be appreciated that the gas generator 62 may be a stored compressed gas used with an electrical trigger in place of a pyrotechnic device.

The seat restrain tensioner 10 includes a rotatable cam 66 is disposed in the channel 39 of the frame 34 between the side walls 38. The cam 66 is rotatably mounted to a stud or shaft 68 extending between the side walls 38 and connected thereto. The stud 68 acts as a pivot point for the cam 66. The cam 66 is generally elliptical in shape and has a radius portion 66a on one side and an eccentric portion 66b on the opposite side of the stud 68. The cam 66 has a cut-out or recess 69 therein to cooperate with the stops 38a to limit rotation of the cam 66. The cam 66 has at least one, preferably a plurality of scallops 70 along the eccentric portion 66b thereof for a function to be described. The cam 66 is made of a metal material such as steel. It should be appreciated that the cam 66 pivots on the stud 68. It should also be appreciated that the cam 66 has a lever arm and clamping surface on the same side as the pivot for the cam 66.

The seat restraint tensioner 10 also includes a cable guide 74 extending through the aperture 40 of the frame 34 and into the channel 39. The cable guide 74 has a head 76 extending radially at one end and a shaft 78 extending from the head 76 and into the aperture 40 in the base wall 36 of the frame 34. The cable guide 74 has an aperture 80 extending axially therethrough for a function to be described. The cable guide 74 is made of a rigid material such as a thermoplastic material. It should be appreciated that the cable guide 74 is secured in the aperture 40 by suitable means such as press fitting.

The seat restraint tensioner 10 includes a cable fitting or rivet 82 attached to a frame of the buckle assembly 30. The cable fitting 82 is generally cylindrical in shape with a generally circular cross-section. The cable fitting 82 is securely connected to the buckle assembly 30 by suitable means such as staking for a function to be described.

The seat restraint tensioner 10 further includes a cable 84 extending through the aperture 80 in the cable guide 74 and having one end wrapped around the cable fitting 82 and back through the aperture 80 of the cable guide 74. The cable 84 is wrapped around the cam 66 and extends axially through the retainer 58. The cable 84 has another end that extends through the passageway 56 in the piston 52. The end of the cable 84 is retained by a plug member or cable clamp 86. The cam 66 may have an annular groove (not shown) to allow the cable 84 to extend therein and around the cam 66. The cable 84 is made of a metal material such as steel. The seat restraint tensioner 10 includes a flexible cover 88 disposed over the cable 84 between the frame 34 and the buckle assembly 30. The cover 88 is made of an elastomeric material such as rubber.

In operation of the seat restraint tensioner 10, an occupant (not shown) grasps the latch plate 24 and pulls on the lap belt 26 and shoulder belt 28. The shoulder belt 28 is unwound by the occupant from the retractor. The occupant engages the latch plate 24 with the buckle assembly 30 to restrain the occupant in the seat 18. The seat restraint tensioner 10 is in an initial or first operative position as illustrated in FIG. 2.

When the vehicle 14 experiences a collision-indicating condition of at least a predetermined threshold level, an electrical signal is sent to the gas generator 62. The gas generator 62 is activated and a gas is expelled by the pyrotechnic device into the gas generation portion 44 of the housing 42. It should be appreciated that the gas is generated very quickly and completely before the piston 50 moves. When the gas generator 62 is fired, the expelled gas generates a pressure in a closed volume and therefore applies a force on the piston 50. The force of the gas against the piston 50 causes the piston 50 to move longitudinally and linearly in the piston portion 43 of the housing 42. Since the piston 50 is connected to the cable 84, the force is also applied to the cable 84, in turn, pulling on the cable 84, in turn, pulling on the cable fitting 82 and buckle assembly 30. As the piston 50 moves further longitudinally, the cable fitting 82 and buckle assembly 30 are pulled downward in a linear manner toward the frame 34 to take up slack in the seat restraint system 12 and secure the occupant in the seat 18 as illustrated in FIG. 3. It should be appreciated that the force of the gas is mechanically transferred to the buckle assembly 30 by pulling on the cable 84. It should also be appreciated that air in the piston portion 43 of the housing 42 is expelled through the aperture 46 as the piston 50 moves toward the aperture 46.

The seat restraint tensioner 10 pulls the buckle assembly 30 down approximately eighty millimeters (80 mm) to approximately one hundred millimeters (100 mm). After firing, the seat restraint tensioner 10 maintains position and locks the cable 84. The cam 66 pivots on the stud 68 and the cable 84, that is wrapped around the eccentric portion of the cam 66, when pulled in a vertical direction will generate a torque about the stud 68. The torque about the stud 68 rotates the cam 66 toward the buckle assembly 30 and into the cable 84 and compresses the cable 84 between the cam 66 and a clamping surface 90 of the frame 34 as illustrated in FIG. 3. The cam 66 generates a clamping force on the cable 84 and prevents reverse travel of the cable 84 and therefore the buckle assembly 30. It should be appreciated that the scallops 70 engage the cable 84. It should also be appreciated that torque and clamping force are on the same side of the stud 68 and the torque lever arm has a predetermined ratio such as 2:1. It should further be appreciated that the seat restraint tensioner 10 may be used for a frontal impact condition for pre-loading before the occupant moves to load the buckle assembly 30 and may be used for a rollover condition having a much faster stroke rate.

Figure 4:
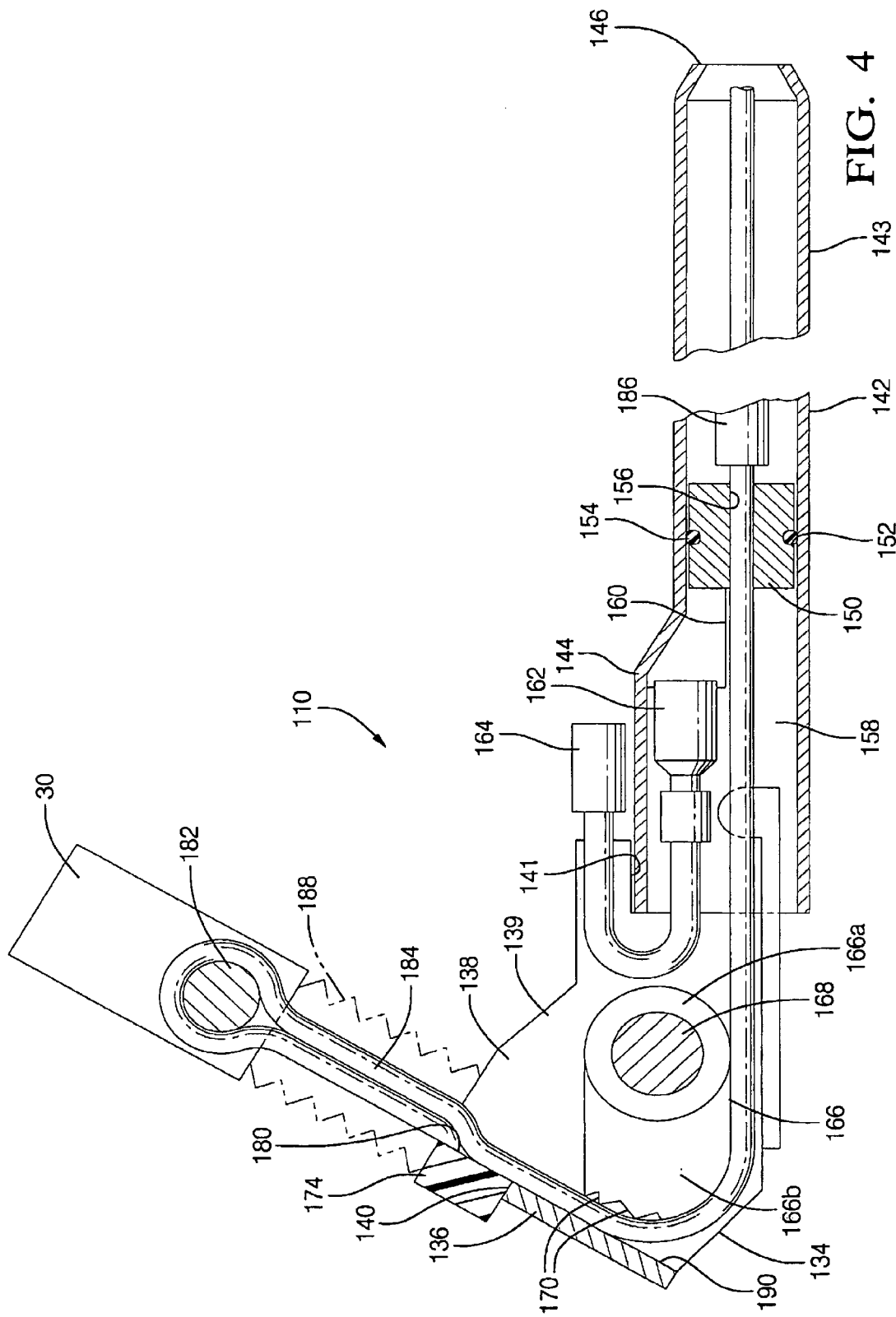
FIG. 4 is an enlarged fragmentary side elevational view of another embodiment, according to the present invention, of the seat restraint tensioner of FIG. 1 illustrating a first operative position.
Figure 5:
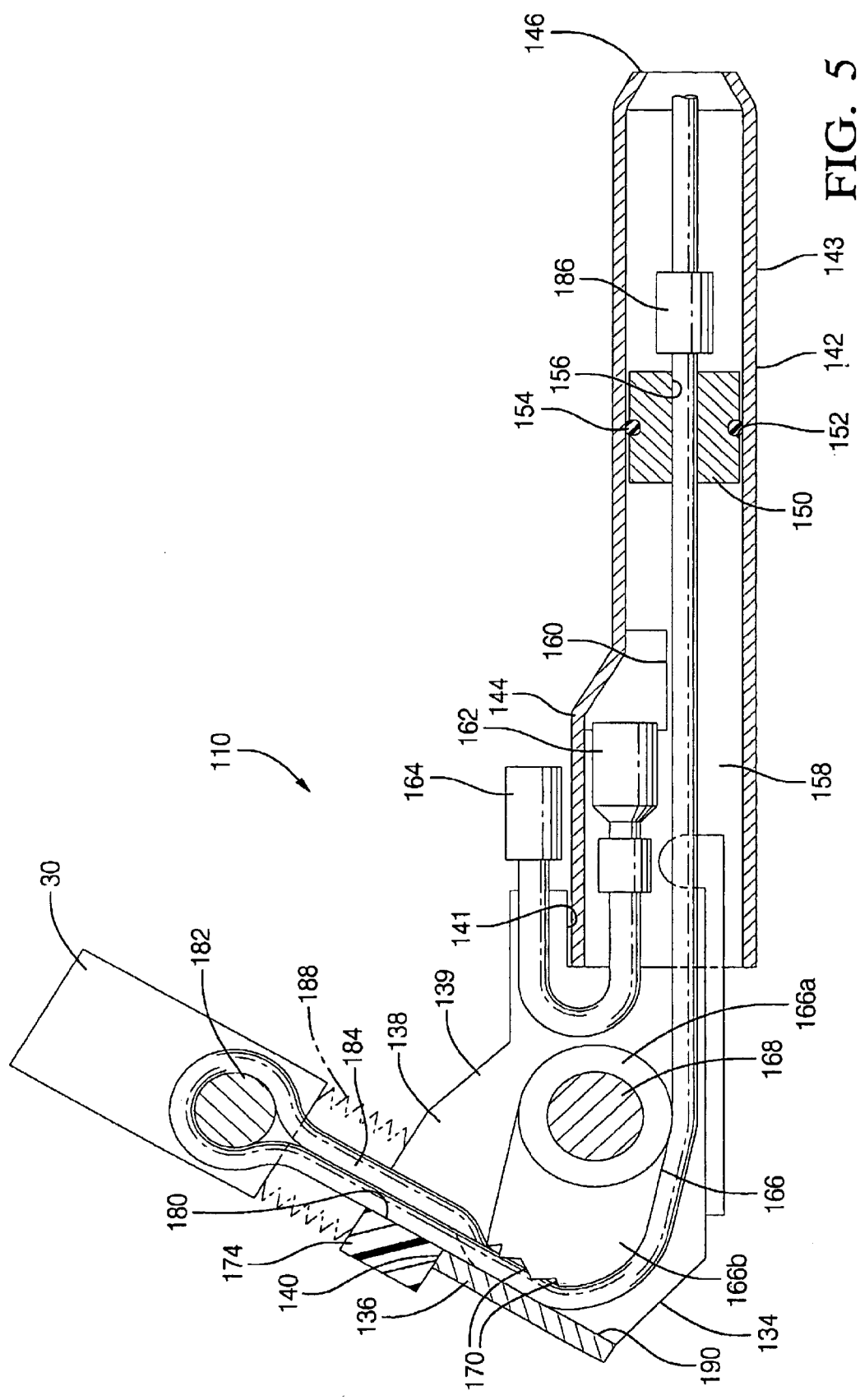
FIG. 5 is a view similar to FIG. 4 of the seat restraint tensioner illustrating a second operative position.

Referring to FIGS. 4 and 5, another embodiment, according to the present invention, of the seat restraint tensioner 10 is shown. Like parts of the seat restraint tensioner 10 have like reference numerals increased by one hundred (100). In this embodiment, the seat restraint tensioner 110 includes a frame 134 connected to the vehicle structure 20 or seat 18 by suitable means such as fasteners (not shown). The frame 134 has a general "U" shape and is made of a metal material such as steel. The frame 134 has a base wall 136 and opposed side walls 138 extending generally perpendicularly from the base wall 136 to form a channel 139 therebetween. The base wall 136 has an aperture 140 extending therethrough for a function to be described. Each of the side walls 138 have a slot 141 extending axially therein for a function to be described. It should be appreciated that the frame 134 is a monolithic structure being integral, unitary, and one-piece.

The seat restraint tensioner 110 also includes a housing 142 secured to the frame 134 by suitable means such as press-fitting. The housing 142 has a first or piston portion 143 extending longitudinally and a second or gas generation portion 144 extending longitudinally from the piston portion 143 at a forward end thereof and having an enlarged diameter. The seat restraint tensioner 110 includes a piston 150 disposed in the piston portion 143 of the housing 142. The piston 150 is generally cylindrical in shape for sliding movement in the piston portion 143. The piston 150 has an annular groove 152 and a seal 154 such as an O-ring disposed in the annular groove 152 to form a seal with an interior surface of the piston portion 143 of the housing 142 to prevent gases from escaping past the piston 150. The piston 150 also has a passageway 156 extending axially therethrough for a function to be described.

The seat restraint tensioner 110 further includes a retainer 158 disposed in the end of the gas generation portion 144 of the housing 142. The retainer 158 has a cutout or recess 160 extending axially therein for a function to be described. The seat restraint tensioner 110 also includes a gas generator 162 such as a micro gas generator assembly disposed in the gas generation portion 144 of the housing 142. The gas generator 162 includes an electrical connector 164 connected to a source of power (not shown) for activating the pyrotechnic device to expel the gas.

The seat restraint tensioner 110 includes a rotatable cam 166 is disposed in the channel 139 of the frame 134 between the sidewalls 138. The cam 166 is rotatably mounted to a stud or shaft 168 extending between the side walls 138 and connected thereto. The stud 168 acts as a pivot point for the cam 166. The cam 166 is generally elliptical in shape and has a radius portion 166a on one side and an eccentric portion 166b on the opposite side of the stud 168. The cam 166 has at least one, preferably a plurality of scallops 170 along the eccentric portion 166b thereof for a function to be described. The cam 166 is made of a metal material such as steel. It should be appreciated that the cam 166 pivots on the stud 168. It should be appreciated that the cam 166 has a lever arm and clamping surface on the same side of the pivot for the cam 166.

The seat restraint tensioner 110 also includes a cable guide 174 extending through the aperture 140 of the frame 134 and into the channel 139. The cable guide 174 has an aperture 180 extending axially therethrough for a function to be described.

The seat restraint tensioner 110 includes a cable fitting or rivet 182 attached to a frame of the buckle assembly 30. The seat restraint tensioner 110 further includes a cable 184 extending through the aperture 180 in the cable guide 174 and having one end wrapped around the cable fitting 182 and back through the aperture 180 of the cable guide 174. The cable 184 extends along a lower side of the cam 166 and extends axially through the retainer 158. The cable 184 has another end that extends through the passageway 156 in the piston 152. The end of the cable 184 is retained by a plug member or cable clamp 186. The seat restraint tensioner 110 includes a flexible cover 188 disposed over the cable 184 between the frame 134 and the buckle assembly 30.

The seat restraint tensioner 110 is in an initial or first operative position as illustrated in FIG. 4. When the vehicle 14 experiences a collision-indicating condition of at least a predetermined threshold level, an electrical signal is sent to the gas generator 162. The gas generator 162 is activated and a gas is expelled by the pyrotechnic device into the gas generation portion 144 of the housing 142. It should be appreciated that the gas is generated very quickly and completely before the piston 150 moves.

When the gas generator 162 is fired, the expelled gas generates a pressure in a closed volume and therefore applies a force on the piston 150. The force of the gas against the piston 150 causes the piston 150 to move longitudinally and linearly in the piston portion 143 of the housing 142. Since the piston 150 is connected to the cable 184, the force is also applied to the cable 184, in turn, pulling on the cable 184, in turn, pulling on the cable fitting 182 and buckle assembly 30.

As the piston 150 moves further longitudinally, the cable fitting 182 and buckle assembly 30 are pulled downward in a linear manner toward the frame 134 to take up slack in the seat restraint system 12 and restrain the occupant in the seat 18 as illustrated in FIG. 5. It should be appreciated that the force of the gas is mechanically transferred to the buckle assembly 30 by pulling on the cable 184. It should also be appreciated that air in the piston portion 143 of the housing 142 is expelled through the aperture 146 as the piston 150 moves toward the aperture 146.

The seat restraint tensioner 110 pulls the buckle assembly 30 down approximately eighty millimeters (80mm) to approximately one hundred millimeters (100mm). After firing, the seat restraint tensioner 110 maintains position and locks the cable 184. The cam 166 pivots on the stud 168 and the cable 184, that extends along one side of the eccentric portion 166b of the cam 166, when pulled in a vertical direction will generate a torque about the stud 168. The torque about the stud 168 rotates the cam 166 toward the buckle assembly 30 and into the cable 184 and compresses the cable 168 between the cam 166 and a clamping surface 190 of the frame 134 as illustrated in FIG. 5. The cam 166 generates a clamping force on the cable 184 and prevents reverse travel of the cable 184 and therefore the buckle assembly 30. The cable locking described above results in a high ensue load path directly from the buckle assembly 30 through the cable 184 and into the cam 166 and the mounting stud 168. It should be appreciated that the scallops 170 engage the cable 184. It should also be appreciated that torque and clamping force are on the same side of the stud 168. It should further be appreciated that the seat restraint tensioner 110 may be used for a frontal impact condition for pre-loading before the occupant moves to load the buckle assembly 30 and may be used for a rollover condition having a much faster stroke rate.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A seat restraint tensioner for a seat restraint system in a vehicle comprising:

a frame for operative connection to vehicle structure;

a cable having a first end and a second end, said first end being operatively connected to a seat restraint of the seat restraint system;

a movable mechanism connected to said second end of said cable to apply a force for tightening the seat restraint when activated;

a rotatable cam being pivotally connected to said frame and having a radius portion on one end and an eccentric portion on an opposite end, said radius portion having a plurality of scallops on one side thereof;

said frame comprising a base wall and opposed side walls extending from said base wall, said base wall including a clamping surface disposed above said scallops of said radius portion of said cam and said cam being disposed between said side walls; and said cam cooperating with said cable to generate a clamping force to clamp said cable between said cam and said clamping surface to prevent reverse travel of said cable after tightening the seat restraint.

2. A seat restraint tensioner as set forth in claim 1 wherein said frame has an aperture extending through said base wall.

3. A seat restraint tensioner as set forth in claim 2 including a cable fitting for connection to the seat restraint of the seat restraint system.

4. A seat restraint tensioner as set forth in claim 3 wherein said first end of said cable is operatively connected to said cable fitting and said cable extends through said aperture along said cam and said second end of said cable is operatively connected to said movable mechanism.

5. A seat restraint tensioner as set forth in claim 4 including at least one cable guide disposed in said aperture, said cable extending through said cable guide.

6. A seat restraint tensioner as set forth in claim 1 wherein said movable mechanism comprises a housing for operative connection to vehicle structure, a movable piston disposed in said housing, and a gas generator operatively connected to said housing for expelling a gas to move said piston.

7. A seat restraint tensioner as set forth in claim 6 wherein said piston includes an annular groove therein and a seal disposed in said groove to prevent gases from exiting past said piston.

8. A seat restraint tensioner as set forth in claim 6 wherein said piston includes a passageway extending longitudinally therethrough, said cable extending through said passageway.

9. A seat restraint tensioner as set forth in claim 8 including a clamp connected to said cable to prevent said cable from exiting said passageway.

10. A seat restraint tensioner as set forth in claim 6 wherein said housing comprises a piston portion extending longitudinally and a gas generation portion extending longitudinally from said piston portion, said gas generation portion having a diameter larger than said piston portion.

11. A seat restraint tensioner as set forth in claim 10 including a retainer disposed in said gas generation portion of said housing to retain said gas generator.

12. A seat restraint tensioner as set forth in claim 6 wherein said gas generator comprises a pyrotechnic device to expel a gas.

13. A seat restraint tensioner for a seat restraint system in a vehicle comprising:

a frame for operative connection to vehicle structure;

a housing connected to said frame;

a movable piston disposed in said housing;

a cable fitting for connection to a buckle assembly of the seat restraint system above said frame;

a cable having on end operatively connected to said cable fitting and another end operatively connected to said piston;

a gas generator operatively connected to said housing for expelling a gas to move said piston to apply a force for pulling-down the buckle assembly;

a rotatable cam pivotally connected to said frame and having a radius portion on one end and an eccentric portion on an opposite end, said radius portion having a plurality of scallops on one side thereof;

said frame can having a base wall and opposed side walls extending from said base wall, said base wall including a clamping surface disposed above said scallops of said radius portion of said cam and said ca being disposed between said side walls; and said cam cooperating with said cable to generate a clamping force on said cable toward the buckle assembly to prevent reverse travel of said cable after pulling-down the buckle assembly.

14. A seat restraint tensioner as set forth in claim 13 wherein said housing comprises a piston portion extending longitudinally and a gas generation portion extending longitudinally from said piston portion, said gas generation portion having a diameter larger than said piston portion.

15. A seat restraint tensioner as set forth in claim 14 wherein said gas generator comprises a pyrotechnic device connected to said housing to expel a gas in said gas generation portion.

16. A seat restraint tensioner as set forth in claim 13 wherein said frame has an aperture extending through said base wall.

17. A seat restraint tensioner as set forth in claim 16 including at least one cable guide dispose in said aperture, said cable extending through said cable guide.

18. A seat restraint tensioner as set forth in claim 13 wherein said piston includes an annular groove therein.

19. A seat restraint tensioner as set forth in claim 18 including a seal disposed in said groove to prevent gases from exiting past said piston.

20. A seat restraint tensioner as set forth in claim 13 wherein said piston includes a passageway extending longitudinally therethrough, said cable extending through said passageway.

21. A seat restraint tensioner as set forth in claim 20 including a clamp connected to said cable prevent said cable from exiting said passageway.

22. A seat restraint tensioner as set forth in claim 13 including a retainer disposed in said gas generation portion of said housing to retain said gas generator.

23. A seat restraint system for a vehicle comprising:
a buckle assembly;
a frame for connection to vehicle structure of the vehicle;
a housing connected to said frame;
a movable piston disposed in said housing;
a cable fitting connected to said buckle assembly;
a cable having one end operatively connected to said cable fitting and another end operatively connected to said piston;
a gas generator operatively connected to said housing for expelling a gas to move said piston to apply a force for pulling-down said buckle assembly;
a rotatable cam pivotally connected to said frame and having a radius portion on one end and an eccentric portion on an opposite end, said radius portion having a plurality of scallops on one side thereof;
said frame comprising a base wall and opposed side walls extending from said base wall, said base wall including a clamping surface disposed above said scallops of said radius portion of said cam and said cam being disposed between said side walls; and
said cam cooperating with said cable to generate a clamping force toward said buckle assembly to clamp said cable between said cam and said clamping surface to prevent reverse travel of said cable after pulling-down said buckle assembly.

24. A seat restraint tensioner for a seat restraint system in a vehicle comprising:
a frame for operative connection to vehicle structure and a housing connected to said frame;
a movable piston disposed in said housing;
a cable fitting or connection to a buckle assembly of the seat restraint system above said frame;
a cable having ne end operatively connected to said cable fitting and another end operatively connected to said piston;
a gas generator operatively connected to said housing for expelling a gas to move said piston to apply a force for pulling-down the buckle assembly; and
a rotatable cam pivotally connected to said frame and having a radius portion on one end and an eccentric portion on an opposite end, said radius portion having a plurality of scallops on one side thereof;
said frame comprising a base wall and opposed side walls extending from said base wall, said base wall including a clamping surface at an angle greater than zero relative to a longitudinal axis of said housing and disposed above said scallops of said radius portion of said cam and said cam being disposed between said side walls; and
said cam cooperating with said cable to generate a clamping force to clamp said cable between said cam and said clamping surface.

* * * * *